US012258743B2

(12) United States Patent
Pilarczyk

(10) Patent No.: US 12,258,743 B2
(45) Date of Patent: *Mar. 25, 2025

(54) BATHTUB DRAIN CONNECTION SYSTEMS

(71) Applicant: WCM Industries, Inc., Colorado Springs, CO (US)

(72) Inventor: Eric Pilarczyk, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 117 days.

This patent is subject to a terminal disclaimer.

(21) Appl. No.: 18/316,673

(22) Filed: May 12, 2023

(65) Prior Publication Data

US 2023/0279649 A1  Sep. 7, 2023

Related U.S. Application Data

(63) Continuation of application No. 16/990,659, filed on Aug. 11, 2020, now Pat. No. 11,674,294.

(60) Provisional application No. 62/885,696, filed on Aug. 12, 2019.

(51) Int. Cl.
*E03C 1/20* (2006.01)
*F16L 27/04* (2006.01)
*F16L 27/10* (2006.01)

(52) U.S. Cl.
CPC ............... *E03C 1/20* (2013.01); *F16L 27/04* (2013.01); *F16L 27/1017* (2013.01)

(58) Field of Classification Search
CPC .............. F16L 27/1017; F16L 27/04; E05F 2005/0415; E03C 1/20; E03F 5/0407; E03F 5/0408; E03D 11/16
See application file for complete search history.

(56) References Cited

U.S. PATENT DOCUMENTS

| 3,873,137 A | 3/1975 | Yamaguchi |
| 3,931,992 A | 1/1976 | Coel |
| 4,207,632 A | 6/1980 | Savell |
| 4,827,539 A | 5/1989 | Kiziah |

(Continued)

FOREIGN PATENT DOCUMENTS

| EP | 1046757 | 10/2000 |
| JP | 2002138545 | 5/2002 |

(Continued)

OTHER PUBLICATIONS

Magnus Home Products Quick Connect Freestanding Tub Drain webpage at: https://www.magnushomeproducts.com/products/quick-connect-freestanding-tub-drain, Aug. 19, 2019, 3 pages.

*Primary Examiner* — Janie M Loeppke

(57) ABSTRACT

A bathtub drain connection system includes a first drain pipe configured to couple to a drain opening of a bathtub and a second drain pipe configured to mount to a floor structure. A drain connector is extends between the first drain pipe and the second drain pipe so that the first drain pipe and the second drain pipe are coupled in fluid communication. The drain connector is configured to allow the first drain pipe to be disposed offset relative to the second drain pipe and in a direction that is substantially parallel to a plane defined by the floor structure.

20 Claims, 6 Drawing Sheets

(56) References Cited

U.S. PATENT DOCUMENTS

| | | | |
|---|---|---|---|
| 6,269,495 B1 * | 8/2001 | Sondrup | ............... E03F 5/0407 |
| | | | 210/163 |
| 6,381,775 B1 | 5/2002 | Sondrup | |
| 6,719,294 B2 | 4/2004 | Nguyen | |
| 6,755,966 B1 | 6/2004 | Reed | |
| 6,792,726 B1 | 9/2004 | Price | |
| 10,167,622 B2 | 1/2019 | Brooks | |
| 10,760,250 B2 | 9/2020 | Ewers | |
| 2001/0045710 A1 | 11/2001 | Nguyen | |
| 2004/0163165 A1 | 8/2004 | Ortiz | |
| 2005/0278841 A1 | 12/2005 | Coronado | |
| 2007/0057502 A1 | 3/2007 | Shakik | |
| 2009/0249535 A1 | 10/2009 | Eichler | |
| 2011/0035867 A1 | 2/2011 | Coronado | |
| 2011/0173747 A1 | 7/2011 | Evans | |
| 2012/0169039 A1 | 7/2012 | Crompton | |
| 2013/0283518 A1 | 10/2013 | Ciechanowski | |
| 2014/0259384 A1 | 9/2014 | McLeod | |
| 2015/0089736 A1 | 4/2015 | Bird et al. | |
| 2015/0115596 A1 | 4/2015 | Donnelly | |
| 2015/0338003 A1 | 11/2015 | Saito | |
| 2017/0058498 A1 | 3/2017 | Castellote | |
| 2017/0089055 A1 | 3/2017 | Hull | |
| 2018/0045344 A1 | 2/2018 | Cloutier | |

FOREIGN PATENT DOCUMENTS

| | | |
|---|---|---|
| JP | 2005248588 | 9/2005 |
| WO | 2009/122292 | 10/2009 |

* cited by examiner

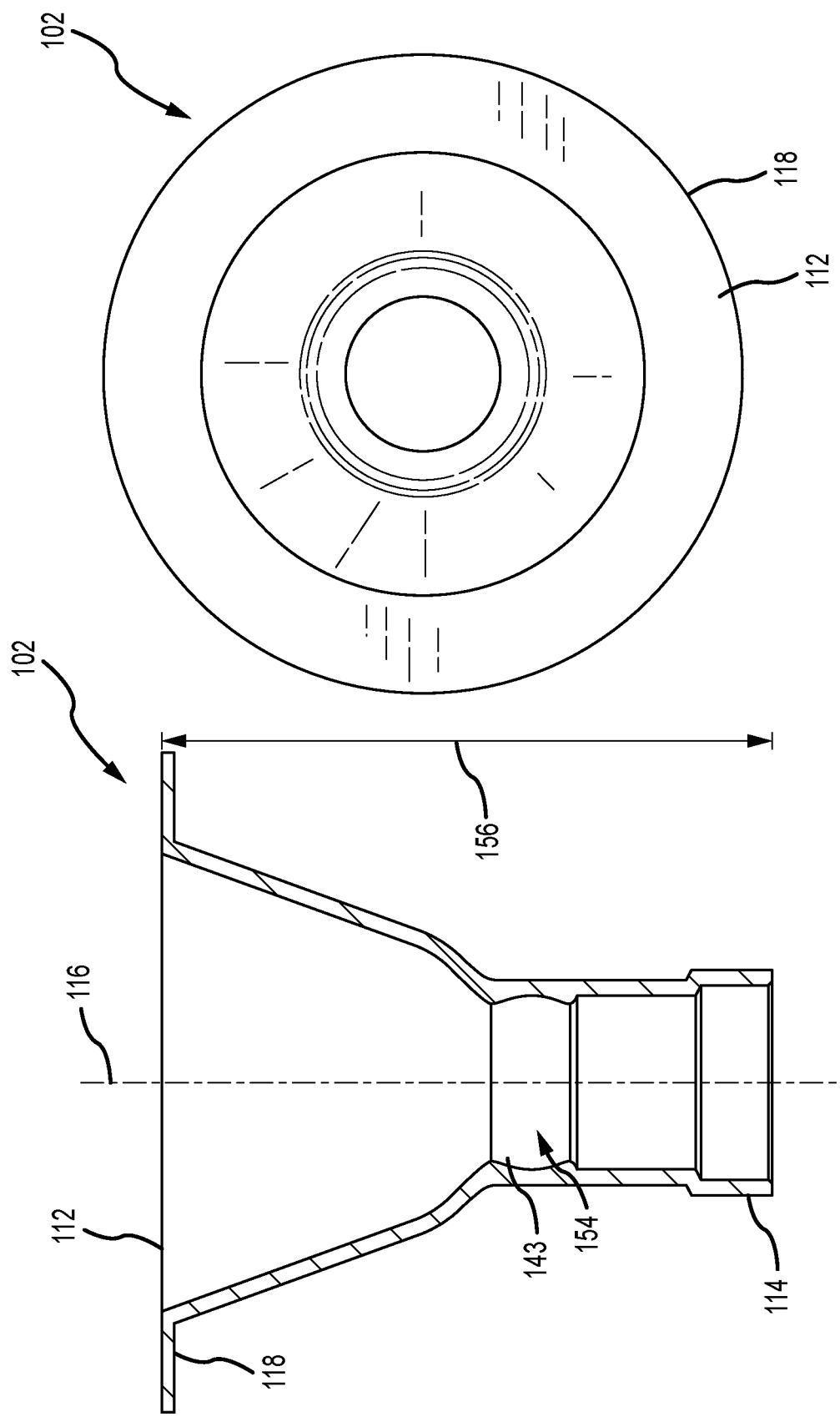

12,258,743 B2

BATHTUB DRAIN CONNECTION SYSTEMS

CROSS-REFERENCE TO RELATED APPLICATIONS

This application claims is a continuation of U.S. patent application Ser. No. 16/990,659 filed Aug. 11, 2020, which claims the benefit of U.S. Provisional Application No. 62/885,696, filed Aug. 12, 2019, the disclosures of which are hereby incorporated by reference herein in their entireties. To the extent appropriate a claim of priority is made to each of the above disclosed applications.

INTRODUCTION

Bathtubs (e.g., bath or tub) are generally large containers that hold water for bathing. Bathtubs can be formed out of thermoformed acrylic, porcelain enameled steel, porcelain enameled cast iron, and the like. As such, most known bathtubs are large and heavy, and thus, often difficult to install and position. During installation, bathtubs are connected to a wastewater system so that water may drain out of the bathtub. Generally, a main waste drain is positioned on a bottom of the bathtub. Additionally, an overflow drain may be positioned on a sidewall of the bathtub.

SUMMARY

In an aspect, the technology relates to a bathtub drain connection system including: a first drain pipe configured to couple to a drain opening of a bathtub; a second drain pipe configured to mount to a floor structure; and a drain connector coupled between the first drain pipe and the second drain pipe so that the first drain pipe and the second drain pipe are coupled in fluid communication, and wherein the drain connector is configured to allow the first drain pipe to be disposed offset relative to the second drain pipe and in a direction that is substantially parallel to a plane defined by the floor structure.

In an example, the drain connector includes a flexible pipe. In another example, each end of the flexible pipe is substantially rigid and a middle section is flexible. In yet another example, the second drain pipe includes an inlet and an opposite outlet, and the inlet has a larger diameter than the outlet. In still another example, the inlet includes a substantially frustoconical shape. In an example, the drain connector includes an inlet and an opposite outlet, and the inlet of the drain connector is pivotably coupled to the first drain pipe.

In another example, a seal is coupled between the outlet of the drain connector and the second drain pipe. In yet another example, the first drain pipe includes an inlet and an opposite outlet, the inlet includes a flange and a threaded outer portion, and the system further includes a lock nut configured to threadingly engage the first drain pipe and secure the first drain pipe to the bathtub. In an example, the outlet of the first drain pipe extends at least partially into the second drain pipe. In another example, a seal is disposed between the lock nut and the flange around the first drain pipe.

In another aspect, the technology relates to a bathtub drain connection system including: a first drain pipe including a first longitudinal axis and configured to couple to a drain opening of a bathtub; a second drain pipe including a second longitudinal axis and configured to mount to a floor structure; and a flexible drain connector including an inlet and an opposite outlet, wherein the inlet couples to the first drain pipe and the outlet couples to the second drain pipe so that the first drain pipe and the second drain pipe are coupled in fluid communication, and wherein the flexible drain connector is configured to allow the bathtub to be movable relative to the floor structure and the first longitudinal axis of the first drain pipe to be substantially parallel to and offset from the second longitudinal axis of the second drain pipe.

In an example, the flexible drain connector includes an inlet, an opposite outlet, and a middle section, and the middle section is flexible. In another example, the second drain pipe includes an inlet and an opposite outlet, and the inlet of the second drain pipe has a larger diameter than the outlet of the second drain pipe. In yet another example, the inlet of the second drain pipe includes a flange. In still another example, the flexible drain connector is configured to allow the bathtub to be moveable in any 360° direction relative to the second drain pipe.

In another aspect, the technology relates to a bathtub drain connection system including: a first drain pipe including a first longitudinal axis and configured to couple to a drain opening of a bathtub; a second drain pipe including a second longitudinal axis and configured to mount to a floor structure; and a drain connector including an inlet and an opposite outlet, wherein the drain connector is configured to couple to both the first drain pipe and the second drain pipe so that the first drain pipe and the second drain pipe are coupled in fluid communication, and wherein the drain connector is pivotable relative to at least one of the first drain pipe or the second drain pipe to allow the bathtub to be movable relative to the floor structure and the first longitudinal axis of the first drain pipe to be substantially parallel to and offset from the second longitudinal axis of the second drain pipe.

In an example, the inlet of the drain connector is coupled to the first drain pipe with a ball joint. In another example, a seal is disposed between the outlet of the drain connector and the second drain pipe. In yet another example, the seal is coupled to the outlet of the drain connector. In still another example, an axial length of the second drain pipe is greater than an axial length of the drain connector.

BRIEF DESCRIPTION OF THE DRAWINGS

There are shown in the drawings examples that are presently preferred, it being understood, however, that the invention is not limited to the precise arrangements and configurations shown.

FIG. 6 is a cross-sectional view of an exemplary drain pipe of the bathtub drain connection system shown in FIG. 3.

FIG. 7 is an end view of the drain pipe shown in FIG. 6.

DETAILED DESCRIPTION

Figure 2:
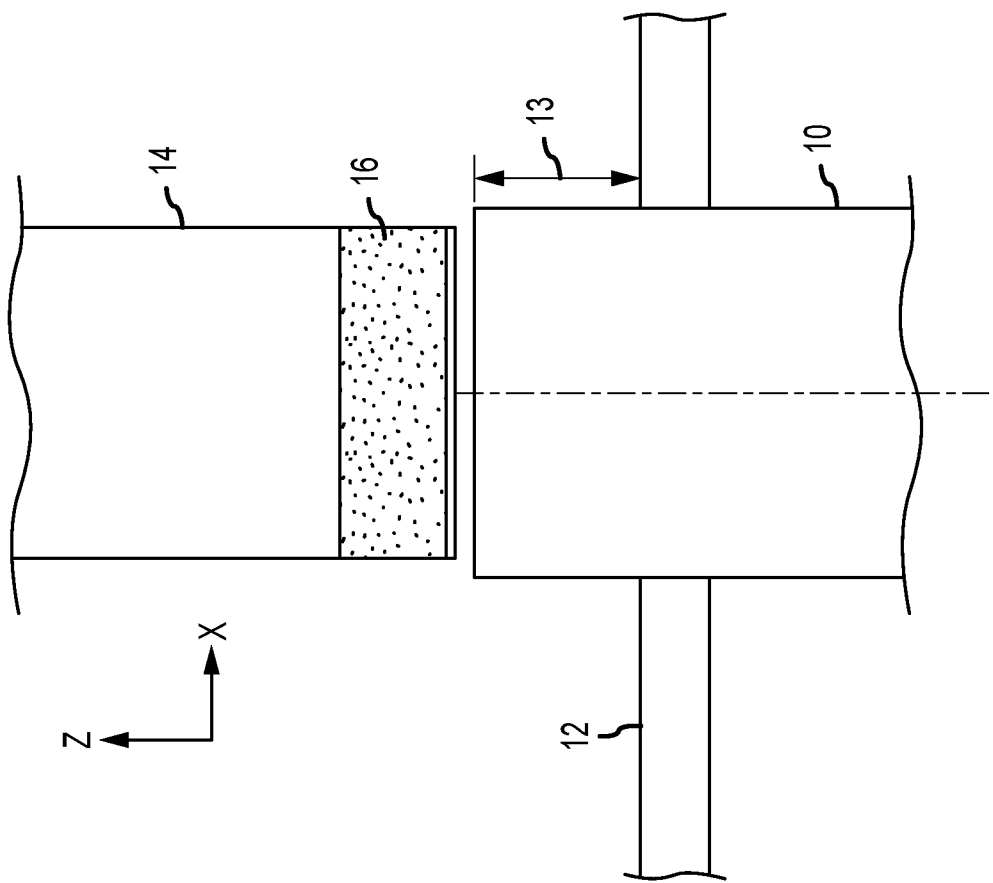
FIG. 2 is an elevation view of the prior art drain pipe with a prior art bathtub drain.
Figure 1:
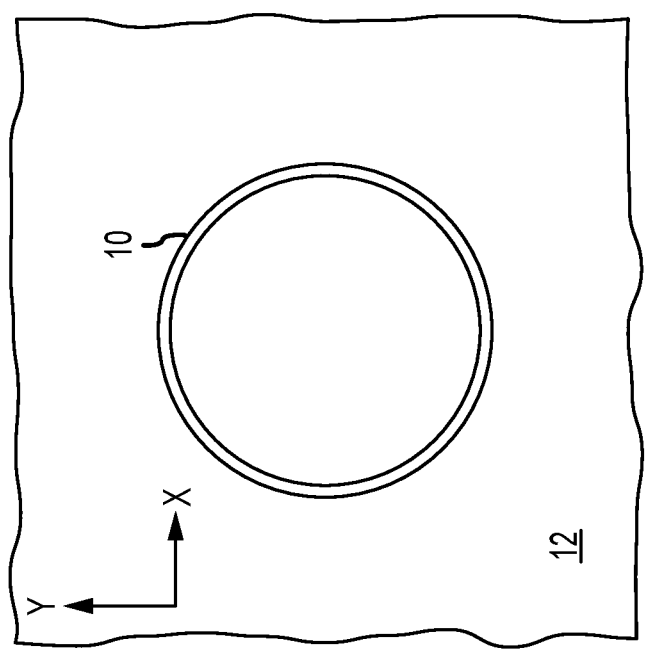
FIG. 1 is a plan view of a prior art drain pipe mounted within a floor structure.

FIG. 1 is a plan view of a prior art drain pipe 10 mounted within a floor structure 12. FIG. 2 is an elevation view of the prior art drain pipe 10 with a prior art bathtub drain pipe 14. Referring concurrently to FIGS. 1 and 2, the drain pipe 10 is connected to a wastewater system of a structure (not shown) and used to drain fluids out of a fluid basin such as a bathtub (not shown). The drain pipe 10 is typically installed in the floor structure 12 that the bathtub is supported on and is oriented so that drainage occurs via gravity. The floor structure 12 can be a concrete slab, wood planking, OSB board, metal sheathing, etc. Generally, installation of the drain pipe 10 occurs prior to finishing the floor structure 12 (e.g., installing hardwood, tile, etc.), and as such, the drain pipe 10 extends a height 13 above the floor structure 12. In other examples, the drain pipe 10 can be recessed within the floor structure 12 as required or desired.

Some known bathtubs are freestanding, such as, but not limited to, claw-foot tubs, floating tubs, and modern-type tubs. These freestanding bathtubs are typically positioned directly on the floor structure 12 and spaced apart from the bathroom walls. As such, many of these bathtubs are installed and connected to the drain pipe 10 only after the floor structure 12 is finished. Other known bathtubs are drop-in, where a frame for the bathtub is constructed on the floor structure 12 and the bathtub is "dropped" into the frame. The installation process for both of these types of bathtubs can be difficult. Bathtubs are typically large and heavy, and thus, difficult to position relative to the drain pipe 10 in the X and Y directions (shown in FIG. 1) on the floor structure 12. Additionally, typically the drain pipe 10 and bathtub drain pipe 14 are tubes that concentrically fit together and form the plumbing connection, so there is not much tolerance in the positioning of the bathtub. For example, in drop-in bathtubs the frame needs to be positioned correctly so that the drain pipes 10, 14 can align. Furthermore, the bathtub drain pipe 14 also must be positioned within the drain pipe 10 in the Z direction (shown in FIG. 2). The connection between the pipes 10, 14 is typically formed with an adhesive 16, and thus, the bathtub drain pipe 14 must overlap with the drain pipe 10 a predetermined distance so as to form the required or desired connection strength. Moreover, because the finished flooring on the floor structure 12 can be installed prior to bathtub installation, if the flooring pattern is offset from the bathtub location, it can be difficult to correct.

Accordingly, a bathtub drain connection system is desired so as to make bathtub installation more efficient and allow for some movement of the bathtub relative to the drain pipe. By having a system that allows the bathtub drain pipe and the drain pipe to be offset from one another, the installation tolerance for the drain pipe within the floor structure is greater and easier to achieve. Additionally, the installation tolerance of the structure of the bathtub is greater, thereby increasing the efficiency of its installation. The bathtub drain connection systems also allows for the bathtub to be moved a little bit after installation. It should be appreciated that while freestanding and drop-in bathtubs are described herein, the connection systems described below can be used with any type of bathtub or other plumbing receptacles (e.g., sinks, toilets, etc.) as required or desired. For example, the connection systems described below increase the tolerance requirements for the bathtub plumbing system, thus increasing installation efficiencies.

Figure 3:
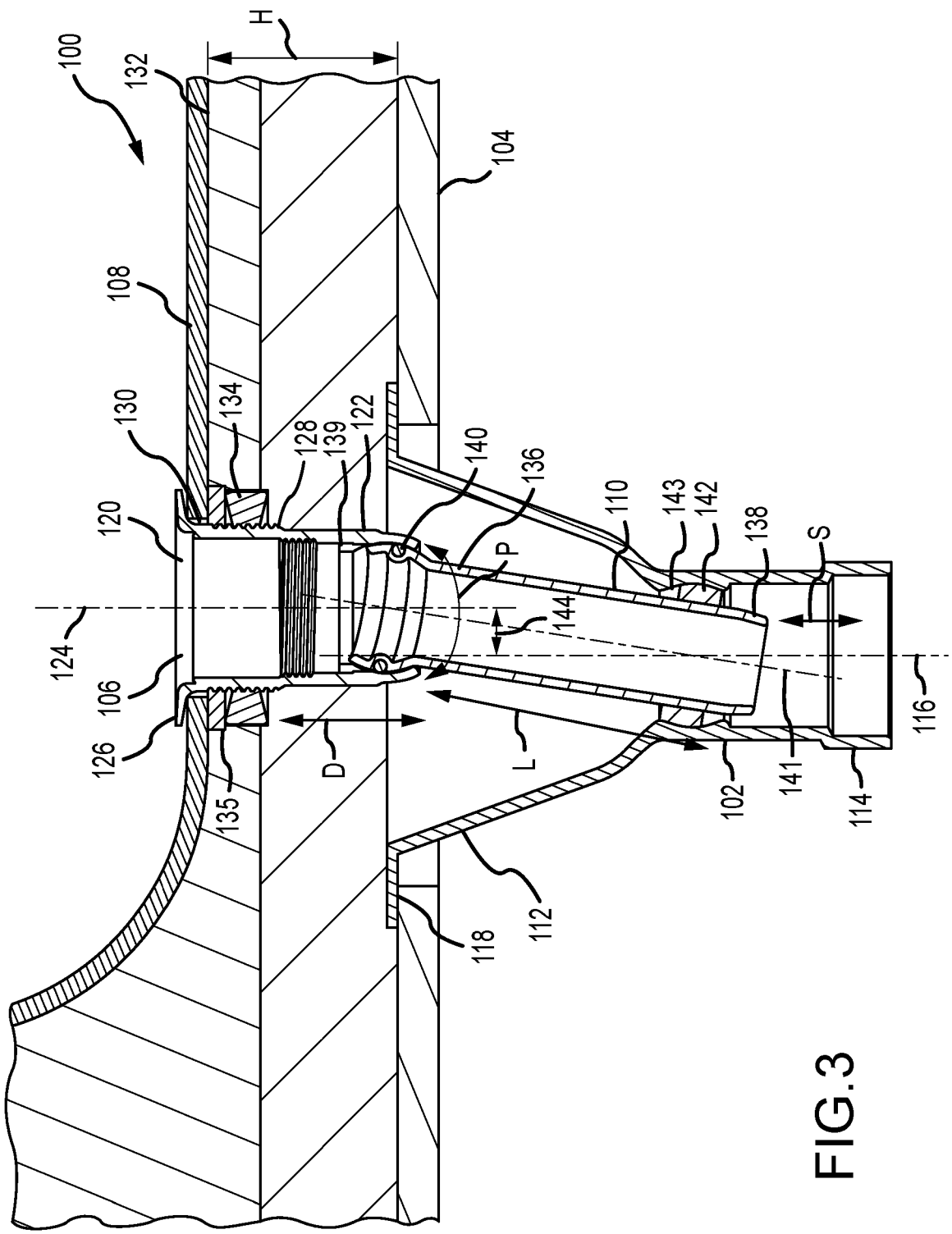
FIG. 3 is a cross-sectional view of an exemplary bathtub drain connection system.

FIG. 3 is a cross-sectional view of an exemplary bathtub drain connection system 100. The system 100 includes a drain pipe 102 that is configured to connect to a wastewater system of a structure (not shown). The drain pipe 102 mounts to a floor structure 104 and is typically in a fixed installed location on the floor structure 104. The system 100 also includes a bathtub drain pipe 106 that couples to a bathtub 108. As such, the bathtub drain pipe 106 and the bathtub 108 are moveable relative to the floor structure 104 during the installation process. Additionally, a drain connecter 110 extends between the drain pipe 102 and the bathtub drain pipe 106 so that fluid can drain from the bathtub 108 and into the wastewater system. In the example, the drain connector 110 is moveable relative to both the drain pipe 102 and the bathtub drain pipe 106 so as to enable the pipes 102, 106 to be offset from, but still parallel to, each other. This configuration allows for gravity draining from the bathtub 108 to still occur.

The drain pipe 102 includes an inlet 112 and an opposite outlet 114 with a first longitudinal axis 116 defined therebetween. The inlet 112 has a flange 118 that is used to mount the drain pipe 102 to the floor structure 104. When the drain pipe 102 is mounted on the floor structure 104, the longitudinal axis 116 extends in a substantially vertical direction. The outlet 114 couples to the wastewater system and extends below the floor structure 104. In the example, the inlet 112 has a diameter that is greater than a diameter of the outlet 114. In this depicted example, the inlet 112 is substantially frustoconical in shape, although other shapes are possible. The drain pipe 102 is described further below and in reference to FIGS. 6 and 7.

The bathtub drain pipe 106 also includes an inlet 120 and an opposite outlet 122 with a second longitudinal axis 124 defined therebetween. The inlet 120 has a flange 126 and an outer threaded portion 128 that are used to mount the bathtub drain pipe 106 to the bathtub 108. The bathtub drain pipe 106 extends through a drain hole 130 on a bottom wall 132 of the bathtub 108, such that the flange 126 rests on the surface of the bathtub. When the bathtub drain pipe 106 is mounted to the bathtub 108, the longitudinal axis 124 extends in a substantially vertical direction. In some examples, a sealant material (not shown) can be placed on a lower surface of the flange 126 for securing the inlet 120 to the bathtub 108. Additionally, a lock nut 134 is threadably received on the threaded portion 128 to tighten against the bottom wall 132 of the bathtub 108 with a seal 135 therebetween. This connection prevents fluid leakage from the drain hole 130 of the bathtub 108. The bathtub drain pipe 106 is described further below and in reference to FIGS. 4 and 5.

The outlet 122 of the bathtub drain pipe 106 extends a distance D downward from the bathtub 108 and the bottom wall 132. In the example, a height H of the bathtub 108 that is above the floor structure 104 is less than the extension distance D of the bathtub drain pipe 106. As such, the outlet 122 of the bathtub drain pipe 106 extends at least partially into the inlet 112 of the drain pipe 102 and as illustrated in FIG. 3 (e.g., the distance D is greater than the height H). In other examples, however, the outlet 122 of the bathtub drain pipe 106 may be positioned above the inlet 112 of the drain pipe 102 (e.g., the distance D less than, or equal to, the height H). In each example, a diameter of the outlet 122 of the bathtub drain pipe 106 is much less than the diameter of the inlet 112 of the drain pipe 102 so that the drain pipes 102, 106 do not directly couple in fluid communication together. As such, unlike the prior art connection shown in FIGS. 1 and 2, merely aligning the bathtub drain pipe 106 with the drain pipe 102 does not couple the two pipes together.

In the example, the drain connector 110 extends between the bathtub drain pipe 106 and the drain pipe 102 so that the two pipes 102, 106 are coupled in fluid communication. The drain connector 110 has an inlet 136 and an opposite outlet 138. The inlet 136 of the drain connector 110 is coupled to the outlet 122 of the bathtub drain pipe 106. In the example, this coupling can be in the form of a ball joint (e.g., ball and socket connection) that enables the drain connector 110 to at least partially pivot P relative to the outlet 122 of the bathtub drain pipe 106. For example, the ball joint may include corresponding curved surfaces on both the outlet 122 of the drain pipe 106 and the inlet 136 of the drain connector 110 with an O-ring 140 therebetween for fluidic sealing. A retainer 139 can be used to hold the inlet 136 of the drain connector 110 within the outlet 122 of the drain pipe 106 and allow the movement as described herein. For example, the drain connector 110 can be dropped through the pipe 106 for pivotable coupling via the retainer 139 and in a press fit connection. In other examples, the outlet 122 of the drain pipe 106 can be coupled to the drain connector 110 via a snap feature connection.

In the example, the inlet 136 of the drain connector 110 may include a recess that receives the O-ring 140 so that movement of the drain connector 110 does not displace the O-ring 140. The ball joint enables the outlet 138 of the drain connector 110 to move away, and be offset, from the second longitudinal axis 124. In other examples, the connection between the bathtub drain pipe 106 and the drain connector 110 can be any other coupling type that enables the drain connector 110 to function as described herein. The drain connector 110 is described further below and in reference to FIGS. 8 and 9.

The drain connector 110 has a third longitudinal axis 141 that extends between the inlet 136 and the outlet 138. The ball joint described above enables the axis 141 of the drain connector 110 to pivot P relative to the bathtub drain pipe 106. This movement allows the drain connector 110 and the third longitudinal axis 141 to tilt so that the outlet 122 of the bathtub drain pipe 106 can be connected to the inlet 112 of the drain pipe 102 even when the axes 124 and 116 are not exactly aligned in the vertical direction. As such, the drain connector 110 is configured to allow the bathtub drain pipe 106 to be disposed offset relative to the drain pipe 102 and in a direction that is substantially parallel to a plane defined by the floor structure 104 (e.g., a substantially horizontal plane). In the example, the pivot movement of the drain connector 110 can be a full 360° relative to the outlet 122 of the bathtub drain pipe 106. This enables the bathtub drain pipe 106, and thus the bathtub 108, to be movable in any direction along the floor structure 104 and relative to the drain pipe 102 as required or desired. In some aspects, the pivot angle of the drain connector 110 can be up to and including about 30°. In other aspects, the pivot angle of the drain connector 110 can be up to and including about 45°.

The outlet 138 of the drain connector 110 has a diameter that is less than the diameter of the outlet 114 of the drain pipe 102. As such, the drain connector 110 can extend at least partially through the drain pipe 102. A seal 142 is positioned between the outlet 138 of the drain connector 110 and the drain pipe 102 so as to fluidly seal the connection. In the example, the drain connector 110 couples to the drain pipe 102 below the frustoconical shaped inlet 112 and above the outlet 114 for the wastewater connection. In the illustrated example, the annular seal 142 can be mounted within the drain pipe 102 and captured therein (e.g., within a recessed seal channel 143 in an inner wall of the drain pipe 102). The seal 142 can also pivot at least partially within the channel 143 because the channel 143 can have a substantially acruate shape as required or desired. This allows for the drain connector 110 to be received and moved while still maintaining a sealed coupling. In another example, the seal 142 can be mounted on the drain connector 110 (e.g., within a recessed seal channel in an outer wall of the drain connector 110) so as to be received by the drain pipe 102 during installation.

In operation, the drain pipe 102 is installed within the floor structure 104 so that its position is fixed and the bathtub drain pipe 106 with the drain connector 110 is coupled to the bathtub 108 so that they are moveable with the bathtub 108. The installers can then align the drain connector 110 with the drain pipe 102. Because the inlet 112 of the drain pipe 102 is enlarged with a frustoconical shape, the system 100 allows for greater tolerances when aligning the bathtub 108 over the drain pipe 102 when compared to the prior art system described in FIGS. 1 and 2. More specifically, the enlarged inlet 112 and the drain connector 110 enables bathtub drain pipe 106 with the second longitudinal axis 124 to be offset 144 from and substantially parallel to the drain pipe 102 and the first longitudinal axis 116. For example, in the X direction and the Y direction that are illustrated in FIG. 1 and within the horizontal plane defined by the floor structure 104. This cannot occur in the above-described prior art system since the pipes are required to concentrically align.

Additionally, because the bathtub drain pipe 106 can be offset 144 from the drain pipe 102, the bathtub 108 can be further moved after the installation of the system 100 as required or desired. For example, to move the bathtub 108 to align with a finished floor pattern on the floor structure 104. In the example, the bathtub drain connection system 100 is configured to be moveable in any 360° direction relative to the longitudinal axis 116 of the drain pipe 102 and in a direction along the horizontal plane. In an aspect, the moveable offset distance of the bathtub drain pipe 106 relative to the drain pipe 102 is at least partially defined by the inlet diameter of the inlet 112 (e.g., the pipe 106 can be moved to any location within the inlet profile of the pipe 102 and the pipe 106 is still disposed above the pipe 102). In another aspect, the moveable offset distance of the bathtub drain pipe 106 relative to the drain pipe 102 is greater than the inlet diameter of the inlet 112 (e.g., the pipe 106 can be fully offset from the pipe 102 and not disposed above the pipe 102 at all).

Furthermore, the drain connector 110 can have a length L so that its outlet 138 can slide S into a location below the frustoconical shape of the inlet 112 of the drain pipe 102. This enables for the connection system 100 to be easily adjustable in the Z direction that is illustrated in FIG. 2 and for the system 100 to be adaptable for a variety of bathtub heights H. As such, the length L of the drain connector 110 is greater than the length of the frustoconical inlet 112 of the drain pipe 102.

In other examples, the system 100 components may be reversed as required or desired. That is, the drain connector 110 may be pivotally connected to the drain pipe 102 and extend upwards therefrom. The bathtub drain pipe 106 can then include a frustoconical shaped outlet that receives a portion of the drain connector 110. This configuration also enables for the drain pipe 102 and the bathtub drain pipe 106 to be offset 144 from one another while allowing for gravity draining of the bathtub 108.

Figure 5:
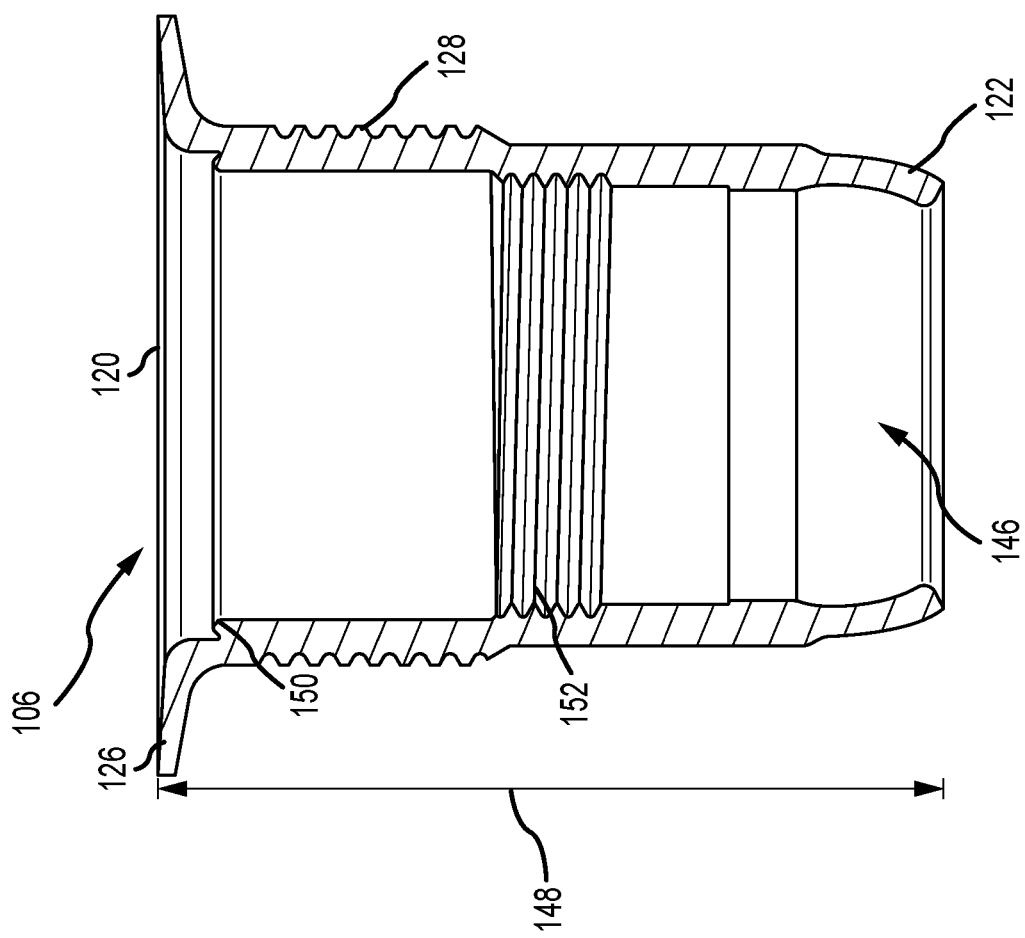
FIG. 5 is a cross-sectional view of the bathtub drain pipe shown in FIG. 4.
Figure 4:
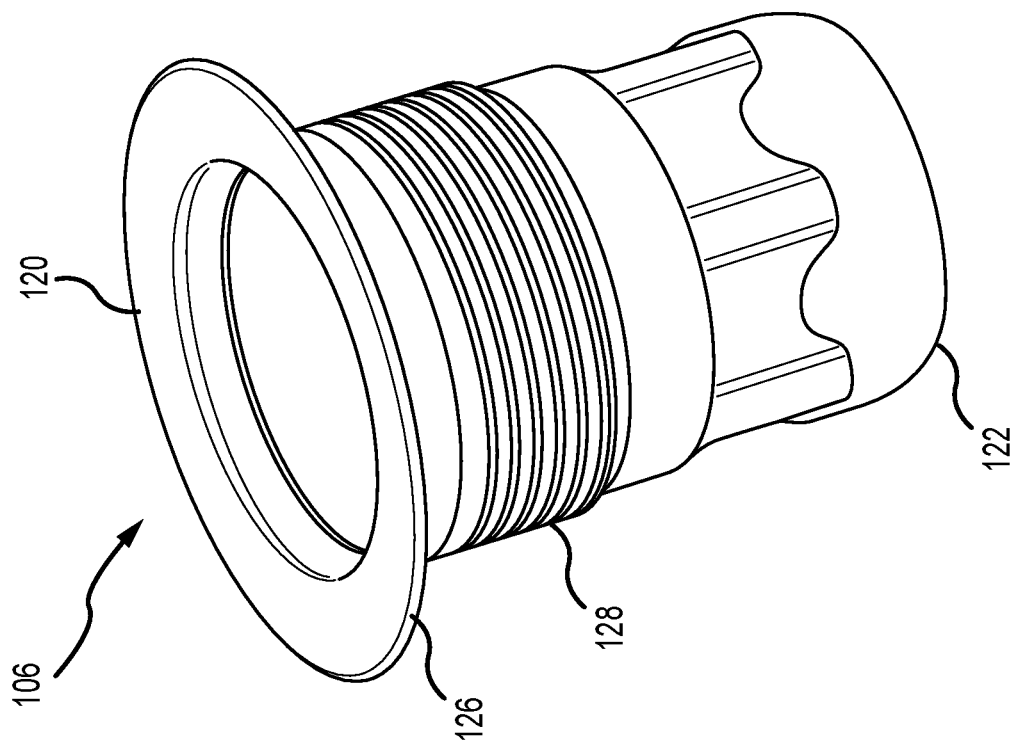
FIG. 4 is a perspective view of an exemplary bathtub drain pipe of the bathtub drain connection system shown in FIG. 3.

FIG. 4 is a perspective view of the exemplary bathtub drain pipe 106 of the bathtub drain connection system 100 (shown in FIG. 3). FIG. 5 is a cross-sectional view of the bathtub drain pipe 106. Referring concurrently to FIGS. 4 and 5, the bathtub drain pipe 106 is configured to couple to a drain opening of a bathtub. The bathtub drain pipe 106 has the inlet 120 with the flange 126 that is configured to mount within the bathtub. An outer surface of the inlet 120 and below the flange 126 includes the threaded portion 128 that is configured to receive the lock nut 134 (shown in FIG. 3) and so as to be secured to the bathtub. The outlet 122 is shaped and sized so as to pivotably receive at least a portion of the drain connector 110 (shown in FIG. 3). In this example, an interior surface 146 of the outlet 122 has a curved surface that extends circumferentially around the pipe. This configuration enables the drain connector to more easily pivot relative to the bathtub drain 106. Additionally, the outlet 122 can receive the retainer 139 (shown in FIG. 3) so as to facilitate the coupling and pivotable movement of the drain connector with the pipe 106.

The bathtub drain pipe 106 has a length 148 that extends from the inlet 120 to the outlet 122. In some examples, the length 148 is such that the outlet 122 is received at least partially within the drain pipe 102 (shown in FIG. 3). In other examples, the length 148 requires the bathtub drain 106 to be disposed outside of the drain pipe 102 when coupled thereto. The length 148 of the bathtub drain 106 can be selected based at least partially on the height of the bathtub. A longer drain pipe 106 may be easier to position during installation, however, a shorter drain pipe 106 may enable for a greater offset distance between the two drain pipes.

Additionally, a lip 150 may be disposed at the inlet 120. A membrane (not shown) is configured to couple to the lip 150 and restrict the flow path of the pipe 106 at the inlet. The membrane is used for leak testing the bathtub and is removable prior to use of the bathtub. In an example, the membrane may be sonic welded to the lip 150. In some examples, an internal threaded portion 152 may be disposed between the inlet 120 and the outlet 122 as required or desired. The internal threaded portion 152 is configured to receive a threaded cross-bar member (not shown) so that a stopper (also not shown) can be replaceably mounted to the pipe 106.

FIG. 6 is a cross-sectional view of the exemplary drain pipe 102 of the bathtub drain connection system 100 (shown in FIG. 3). FIG. 7 is an end view of the drain pipe 102. Referring concurrently to FIGS. 6 and 7, the drain pipe 102 is configured to mount to a floor structure. The drain pipe 102 has the inlet 112 with the flange 118 that mounts to the floor structure. In the example, the inlet 112 has a substantially frustoconical shape. The outlet 114 is configured to couple to a wastewater system (e.g., for expelling the spent water from the bathtub). In the example, the inlet 112 is substantially circular in cross-sectional shape and has a diameter that is larger than the outlet 114 that is also substantially circular in cross-sectional shape. In an aspect, the inlet 112 is equal to, or greater than, twice the outlet 114 so that the drain connector 110 (shown in FIG. 3) is more easily receivable. In another aspect, the inlet 112 is equal to, or greater than, three times the outlet 114. In still other aspects, the cross-sectional shape of the inlet 112 is different than the cross-sectional shape of the outlet 114.

Additionally, the inlet 112 and the outlet 114 are axially aligned along the longitudinal axis 116. In other examples, the inlet 112 may be offset relative to the outlet 114 as required or desired. For example, if the drain pipe 102 is used against a wall, the inlet 112 can maintain its enlarged shape relative to the outlet 114, but have its centerpoint offset from the longitudinal axis 116 and so that it extends farther in one direction than another.

Between the inlet 112 and the outlet 114, the drain pipe 102 includes the channel 143 that has an interior surface 154 with a curved surface that extends circumferentially around with the pipe. This interior surface 154 is configured to receive the seal 142 (shown in FIG. 3) and allow the seal 142 and/or the drain connector 110 to pivot relative thereto. In an aspect, the seal 142 can be mounted within the drain pipe 102 (e.g., captured within) so as to receive the drain connector. In other aspects, the seal 142 may be coupled to the drain connector and be inserted at least partially into the interior surface 154 as required or desired.

The drain pipe 102 has a length 156 that extends from the inlet 120 to the outlet 122. In some examples, the length 156 is greater than the length of the drain connector 110 so that the connection system is easily adjustable in the Z direction and for the system to be adaptable for a variety of bathtub heights.

Figure 9:
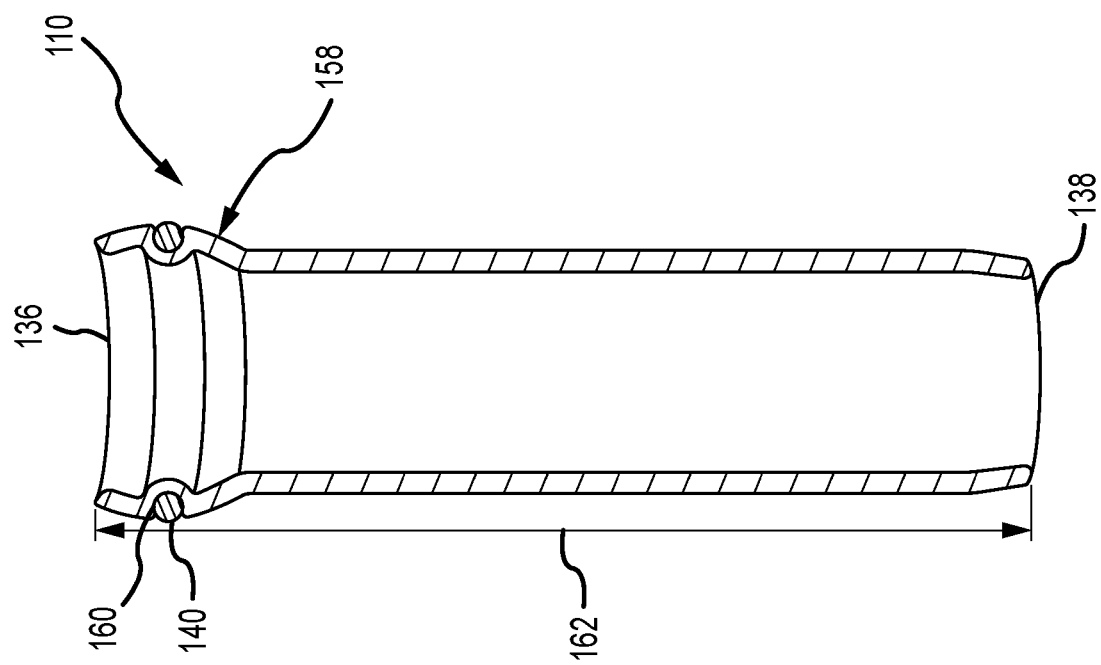
FIG. 9 is a cross-sectional view of the drain connecter shown in FIG. 8.
Figure 8:
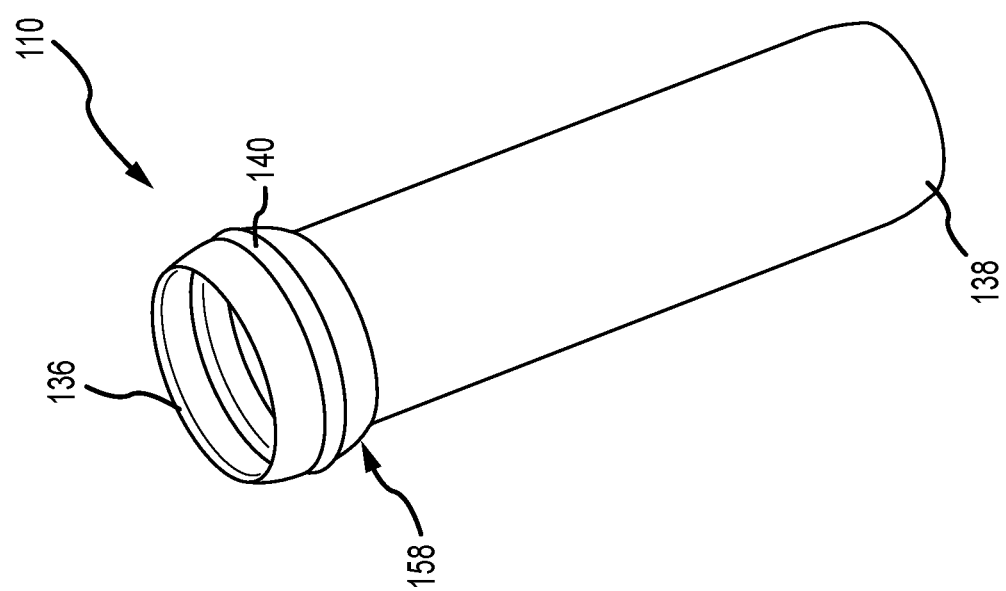
FIG. 8 is a perspective view of an exemplary drain connecter of the bathtub drain connection system shown in FIG. 3.

FIG. 8 is a perspective view of the exemplary drain connecter 110 of the bathtub drain connection system 100 (shown in FIG. 3). FIG. 9 is a cross-sectional view of the drain connecter 110. Referring concurrently to FIGS. 8 and 9, the drain connector 110 is configured to couple the drain pipe 102 (shown in FIGS. 6 and 7) and the bathtub drain pipe 106 (shown in FIGS. 4 and 5) in fluid communication. The drain connector 110 has the inlet 136 and the opposite outlet 138. The inlet 136 is configured to couple to the bathtub drain pipe 106 and pivot relative thereto. The inlet 136 includes an outer surface 158 that has a curved surface that extends circumferentially around the pipe. The outer surface 158 has a channel 160 defined therein to receive the O-ring 140. The outlet 138 is at least partially tapered so that it is easier to insert into the drain pipe 102. In some examples, the outlet 138 can include the seal 142 (shown in FIG. 3) coupled thereto. The drain connector 110 has a length 162 from the inlet 136 to the outlet 138. In some examples, the length 162 is less than the length of the drain pipe 102.

In the example illustrated in FIG. 3, the inlet 136 is pivotably coupled to the bathtub drain pipe 106 and at an interior curved surface. As such, the outer surface 158 corresponds in shape and size to the interior curved surface. Additionally, the outer surface 158 is at least partially enlarged so as to be pivotably secured to the drain pipe 106. In other examples, the drain connector 110 can be reversed and the inlet 136 coupled to the interior curved surface of the drain pipe 102 and extend in an upwards direction. In this example, the inlet 136 becomes the flow outlet and the bathtub can be coupled to the end of the outlet 138 (now the inlet) during installation.

Figure 10:
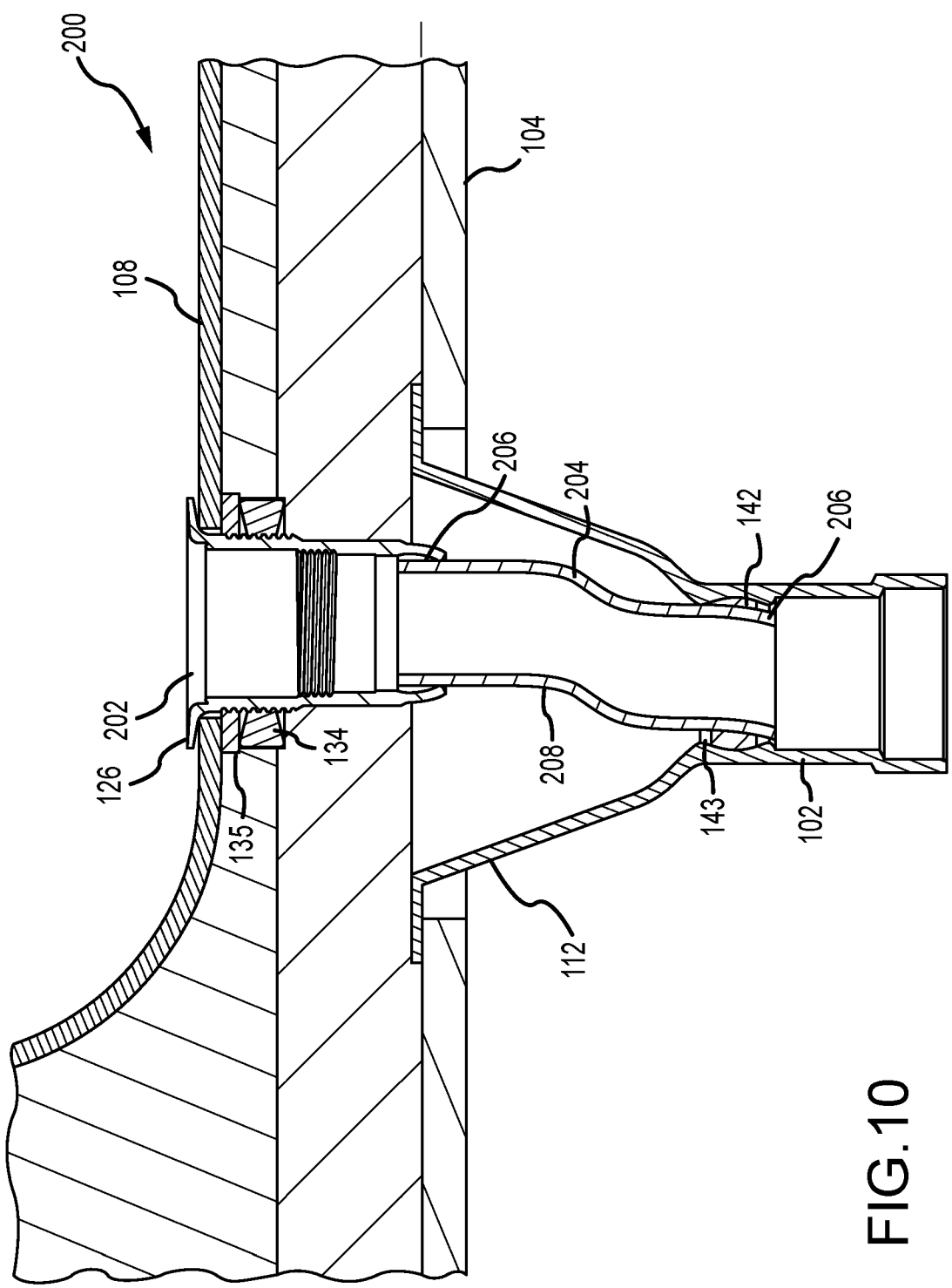
FIG. 10 is a cross-sectional view of another bathtub drain connection system.

FIG. 10 is a cross-sectional view of another bathtub drain connection system 200. Certain components are described above in reference to FIGS. 3-9, and thus, are not necessarily described further. Similar to the example described above, the system 200 also increases installation efficiencies of the bathtub 108. In the example, the drain pipe 102 has an enlarged inlet 112 that is mounted within the floor structure 104 and a bathtub drain pipe 202 is coupled to the bathtub 108. A drain connector 204 couples the drain pipe 102 to the bathtub drain pipe 202 and in fluid communication with each other. However, the drain connector 204 is flexible so that the drain pipe 102 can be offset from the bathtub drain pipe 202 as described above. Such a flexible drain connector 204 can be used with or without the pivotable connection system (e.g., ball joint) described above with respect to FIG. 3.

Additionally, similar to the above example, the components of the system 200 may be reversed as required or desired. That is, the drain connector 204 may extend upwards from the drain pipe 102 and the bathtub drain pipe 202 can then include a frustoconical shaped outlet that receives a portion of the drain connector 204.

In one example, the flexible drain connector 204 has two ends 206 and a middle section 208. The ends 206 can be substantially rigid so as to more easily couple to the drain pipes 102, 202, while the middle section 208 is flexible so as to enable the movement of the system 200 as described herein. The flexible drain connector 204 is configured to allow the bathtub 108 to be movable in any 360° direction relative to the floor structure 104 and allow the drain pipes 102, 202 to be substantially parallel to and offset from one another. In some aspects, the ends 206 can be sealed with the pipes 102, 202 with the seal 142. The seal 142 can be disposed at each end, or just one end, as required or desired.

Additionally or alternatively, the bathtub drain pipe 202 may have the flexible drain connector 204 integrally formed at its outlet. For example, the drain pipe 202 at and above the threaded portion is substantially rigid so as to couple to the bathtub 108 as described herein. Below the threaded portion, the drain pipe 202 can have a flexible portion so that its outlet can be disposed offset from the inlet as described herein. The outlet can be received by the drain pipe 102 and allow movement of the bathtub 108 as required or desired.

The materials utilized in the bathtub drain connection system described herein may be those typically utilized for plumbing hardware component manufacture.

While there have been described herein what are to be considered exemplary and preferred examples of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. A bathtub drain connection system comprising:
   a first drain pipe configured to couple to a drain opening of a bathtub, wherein the first drain pipe comprises a first inlet and an opposite first outlet with a first longitudinal axis defined therebetween;
   a second drain pipe configured to mount to a floor structure, wherein the second drain pipe comprises a second inlet and an opposite second outlet with a second longitudinal axis defined therebetween, and wherein the second inlet is wider than the first inlet; and
   a drain connector coupled between the first drain pipe and the second drain pipe so that the first drain pipe and the second drain pipe are coupled in fluid communication, and wherein the drain connector is configured to allow the first longitudinal axis to be offset relative to the second longitudinal axis.

2. The bathtub drain connection system of claim 1, wherein the drain connector comprises a flexible pipe.

3. The bathtub drain connection system of claim 2, wherein each end of the flexible pipe is substantially rigid and a middle section is flexible.

4. The bathtub drain connection system of claim 1, wherein the second inlet has a larger diameter than the second outlet.

5. The bathtub drain connection system of claim 4, wherein the second inlet comprises a substantially frustoconical shape.

6. The bathtub drain connection system of claim 1, wherein the drain connector comprises an inlet and an opposite outlet, and wherein the inlet of the drain connector is pivotably coupled to the first drain pipe.

7. The bathtub drain connection system of claim 6, further comprising a seal coupled between the outlet of the drain connector and the second drain pipe.

8. The bathtub drain connection system of claim 1, the first inlet comprising a first flange and a threaded outer portion, and wherein the system further comprises a lock nut configured to threadingly engage the first drain pipe and secure the first drain pipe to the bathtub.

9. The bathtub drain connection system of claim 8, wherein the first outlet of the first drain pipe extends at least partially into the second drain pipe.

10. The bathtub drain connection system of claim 8, further comprising a seal disposed between the lock nut and the first flange around the first drain pipe.

11. A bathtub drain connection system comprising:
    a first drain pipe comprising a first longitudinal axis and configured to couple to a drain opening of a bathtub, wherein the first drain pipe comprises a first inlet;
    a second drainpipe comprising a second longitudinal axis and configured to mount to a floor structure, wherein the second drain pipe comprises a second inlet, and wherein the second inlet is wider than the first inlet; and
    a flexible drain connector comprising an inlet and an opposite outlet, wherein the inlet couples to the first drain pipe and the outlet couples to the second drain pipe so that the first drain pipe and the second drain pipe are coupled in fluid communication, and wherein the flexible drain connector is configured to allow the bathtub to be movable relative to the floor structure and the first longitudinal axis of the first drain pipe to be substantially parallel to and offset from the second longitudinal axis of the second drain pipe.

12. The bathtub drain connection system of claim 11, wherein the flexible drain connector comprises an inlet, an opposite outlet, and a middle section, and wherein the middle section is flexible.

13. The bathtub drain connection system of claim 11, wherein the second drain pipe comprises the second inlet and an opposite second outlet, and wherein the second inlet of the second drain pipe has a larger diameter than the second outlet of the second drain pipe.

14. The bathtub drain connection system of claim 13, wherein the first inlet of the first drain pipe comprises a first flange, and the second inlet of the second drain pipe comprises a second flange.

15. The bathtub drain connection system of claim 11, wherein the flexible drain connector is configured to allow the bathtub to be moveable in any 360° direction relative to the second drain pipe.

16. A bathtub drain connection system comprising:
    a first drain pipe comprising a first longitudinal axis and configured to couple to a drain opening of a bathtub, wherein the first drain pipe comprises a first inlet;
    a second drain pipe comprising a second longitudinal axis and configured to mount to a floor structure, wherein the second drain pipe comprises a second inlet, wherein the second inlet is wider than the first inlet; and
    a drain connector comprising an inlet and an opposite outlet, wherein the drain connector is configured to couple to both the first drain pipe and the second drain pipe so that the first drain pipe and the second drain pipe are coupled in fluid communication, and wherein the drain connector is pivotable relative to at least one of the first drain pipe or the second drain pipe to allow the bathtub to be movable relative to the floor structure and the first longitudinal axis of the first drain pipe to be substantially parallel to and offset from the second longitudinal axis of the second drain pipe.

17. The bathtub drain connection system of claim 16, wherein the inlet of the drain connector is coupled to the first drain pipe with a ball joint.

18. The bathtub drain connection system of claim 16, further comprising a seal disposed between the outlet of the drain connector and the second drain pipe.

19. The bathtub drain connection system of claim 18, wherein the seal is coupled to the outlet of the drain connector.

20. The bathtub drain connection system of claim 16, wherein an axial length of the second drain pipe is greater than an axial length of the drain connector.

* * * * *